(12) United States Patent
Qiu et al.

(10) Patent No.: US 11,181,312 B2
(45) Date of Patent: Nov. 23, 2021

(54) VEHICLE, THAWING SYSTEM AND SERVER

(71) Applicant: TOYOTA JIDOSHA KABUSHIKI KAISHA, Toyota (JP)

(72) Inventors: Zekai Qiu, Nisshin (JP); Hironobu Kitaoka, Nisshin (JP); Naoki Yamamuro, Nagoya (JP); Kozo Kosho, Toyota (JP); Hiroaki Sugiyama, Nagoya (JP); Makoto Ikegami, Obu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 295 days.

(21) Appl. No.: 16/166,041

(22) Filed: Oct. 19, 2018

(65) Prior Publication Data
US 2019/0120536 A1    Apr. 25, 2019

(30) Foreign Application Priority Data
Oct. 20, 2017  (JP) .............................. JP2017-203744

(51) Int. Cl.
*F25D 21/00*    (2006.01)
*B60H 1/00*     (2006.01)
(Continued)

(52) U.S. Cl.
CPC ............ *F25D 21/008* (2013.01); *A23L 3/365* (2013.01); *B60H 1/00264* (2013.01);
(Continued)

(58) Field of Classification Search
CPC ... A23L 3/365; B60H 1/00264; F25D 29/003; F25D 31/005
(Continued)

(56) References Cited

U.S. PATENT DOCUMENTS 10,207,804 B1\* 2/2019 Gentry ..................... B64D 9/00
2009/0272132 A1\* 11/2009 Rusignuolo ........... F25D 29/003
                                                          62/77
(Continued)

FOREIGN PATENT DOCUMENTS

GN    203931008 U    11/2014
GN    104215012 A    12/2014
(Continued)

OTHER PUBLICATIONS

"Modern Kitchen Equipment Technology", by A. Milson et al., China Urban Economic and Social Press, Oct. 1990, p. 117, 25 pages.

*Primary Examiner* — Russell Frejd
*Assistant Examiner* — Luke Huynh
(74) *Attorney, Agent, or Firm* — Hunton Andrews Kurth LLP

(57) ABSTRACT

The vehicle includes a thawing compartment configured to thaw a commodity housed therein, an acquisition device configured to obtain information including a thawing time limit set based on a request from a user, and a controller configured to control the thawing operation of the thawing compartment. The controller controls the thawing compartment so as to complete the thawing operation of the commodity housed therein by the thawing time limit.

1 Claim, 16 Drawing Sheets

(51) Int. Cl.
    *A23L 3/365*     (2006.01)
    *F25D 29/00*     (2006.01)
    *F25D 31/00*     (2006.01)
    *B60H 1/32*     (2006.01)

(52) U.S. Cl.
    CPC ......... *F25D 29/003* (2013.01); *F25D 31/005* (2013.01); *B60H 1/3232* (2013.01)

(58) Field of Classification Search
    USPC .......................................................... 701/36
    See application file for complete search history.

(56) References Cited

U.S. PATENT DOCUMENTS

2014/0370167 A1* 12/2014 Garden .................. B60P 3/007
                                                                                                    426/233
2017/0071234 A1* 3/2017 Garg ........................ A23L 3/365
2017/0203633 A1* 7/2017 High .......................... B60H 1/32

FOREIGN PATENT DOCUMENTS

| JP | 2001101281 A | 4/2001 |
| JP | 2001-147075 A | 5/2001 |
| JP | 2014149191 A | 8/2014 |

* cited by examiner

| COMMODITY TYPE | CHICKEN MEAT |
|---|---|
| STORAGE TEMPERATURE | 5°C |
| WEIGHT | 200g |
| STORAGE TYPE | REFRIGERATED |
| COMMODITY SHAPE | SLICE |

| COMMODITY NAME | CHICKEN MEAT | FROZEN BEEF | LETTUCE |
|---|---|---|---|
| STORAGE TEMPERATURE | 5°C | -10°C | 5°C |
| WEIGHT | 200g | 400g | 100g |
| STORAGE TYPE | REFRIGERATED | FROZEN | REFRIGERATED |
| COMMODITY SHAPE | SLICE | CHUNK | - |

VEHICLE, THAWING SYSTEM AND SERVER

This non-provisional application is based on Japanese Patent Application No. 2017-203744 filed on Oct. 20, 2017 with the Japan Patent Office, the entire contents of which are hereby incorporated by reference.

BACKGROUND

Field

The present disclosure relates to a vehicle, a thawing system and a server.

Description of the Background Art

Japanese Patent Laying-Open No. 2001-147075 describes a refrigerating system including a refrigerator and a remote controller disposed at a position distant from the refrigerator.

In the refrigeration system described above, the refrigerator sends information such as the temperature inside the refrigerator to the remote controller. Thus, the user may know the temperature inside the refrigerator from a location distant from the refrigerator, and may change the preset temperature inside the refrigerator as well.

SUMMARY

After a user purchases frozen foods at a store or the like, the user may use a vehicle to transport the frozen foods to a destination where the frozen foods are cooked. In this case, some of the frozen foods may not be cooked immediately in the frozen state, it is necessary to thaw these frozen foods at the destination.

The present disclosure has been made in view of the aforementioned problems, and an object thereof is to provide a vehicle and a thawing system capable of thawing frozen foods or the like before reaching a destination.

A vehicle according to the present disclosure includes a thawing compartment configured to thaw a commodity housed therein, an acquisition device configured to obtain information including a thawing time limit set based on a request from a user, and a controller configured to control the thawing operation of the thawing compartment. The controller controls of the thawing compartment so as to complete the thawing operation of the commodity housed therein by the thawing time limit.

The acquisition device obtains a thawing schedule indicating a temperature transition of temperatures for thawing the commodity housed in the thawing compartment, and the information including the thawing time limit is the thawing schedule. The acquisition device obtains the thawing schedule before the commodity is housed in the thawing compartment.

A thawing system according to the present disclosure includes a vehicle, a user terminal used by a user, and a server configured to communicate with the user terminal and the vehicle. The vehicle includes a thawing compartment configured to thaw a commodity housed therein, an acquisition device configured to obtain information including a thawing time limit set based on a request from the user, and a controller configured to control the thawing operation of the thawing compartment. The controller controls of the thawing compartment so as to complete the thawing operation of the commodity housed therein by the thawing time limit.

The request includes thawing information affecting thawing conditions of a commodity selected by the user and destination information indicating a destination. The server obtains the thawing time limit from the destination information, the server creates a thawing schedule based on the information including the thawing time limit and the destination information so as to complete the thawing operation of the commodity selected by the user by the thawing time limit, and the vehicle drives the thawing compartment based on the received thawing schedule system so as to complete the thawing operation of the commodity housed therein by the thawing time limit.

A server according to the present disclosure is a server configured to communicate with a vehicle provided with a thawing compartment and a user terminal used by a user. The server sends a thawing schedule to the vehicle so as to complete the thawing operation of the commodity selected by the user by the thawing time limit set based on the request from the user.

The request includes destination information indicating a destination, and the thawing time limit is set based on the destination information.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Figure 1:
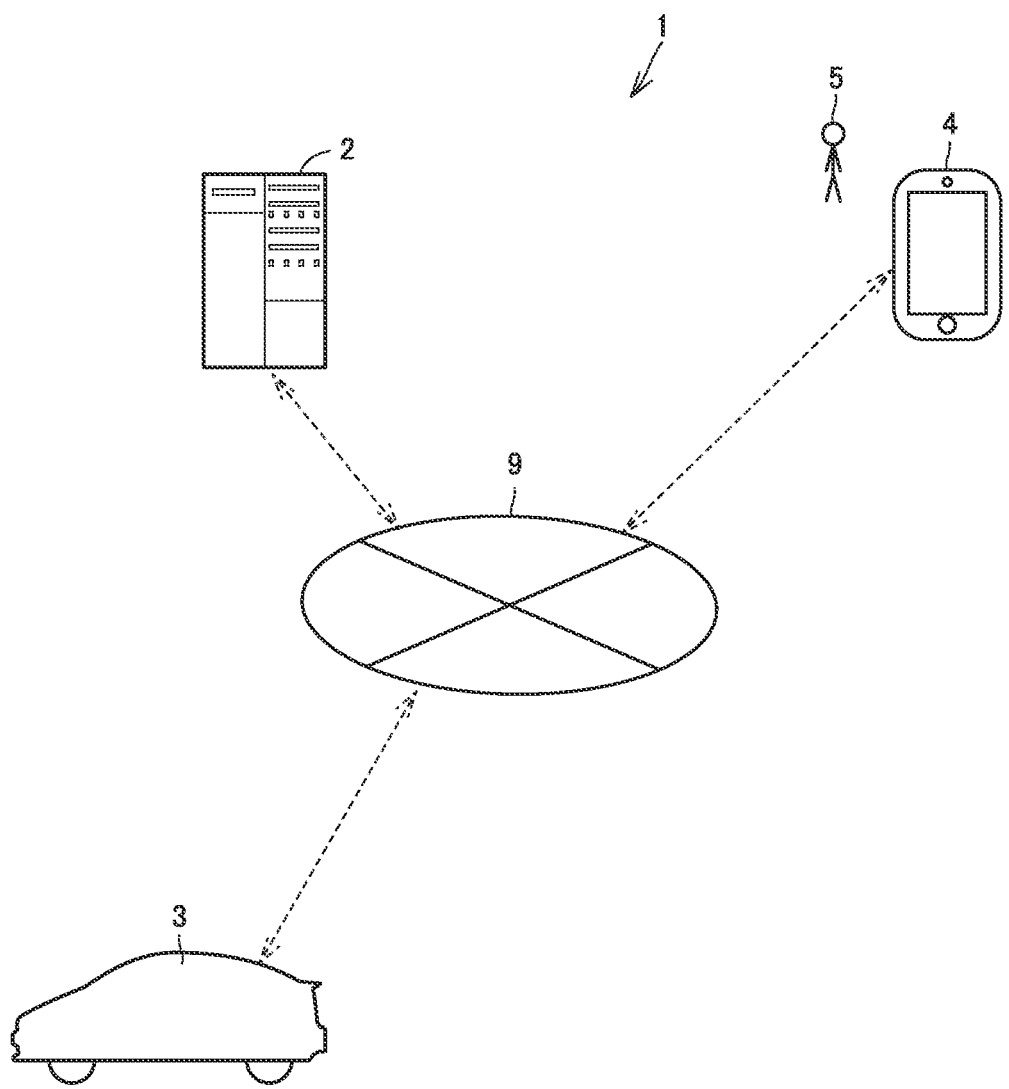
FIG. 1 is a schematic diagram schematically illustrating a thawing system 1.

A thawing system 1 according to the present embodiment will be described with reference to FIGS. 1 to 20. In the configurations illustrated in FIGS. 1 to 20, the same or substantially the same components are designated by the same reference numerals, and the description thereof will not be repeated.

FIG. 1 is a schematic diagram schematically illustrating the thawing system 1. The thawing system 1 includes a server 2, a vehicle 3, a user terminal 4, and the Internet 9.

The server 2, the vehicle 3 and the user terminal 4 are configured to communicate with each other via the Internet 9.

The user terminal 4 is a terminal device to be carried by a user 5. As examples of the user terminal 4, a smart phone, a mobile phone, a personal computer, and the like may be given.

Figure 2:
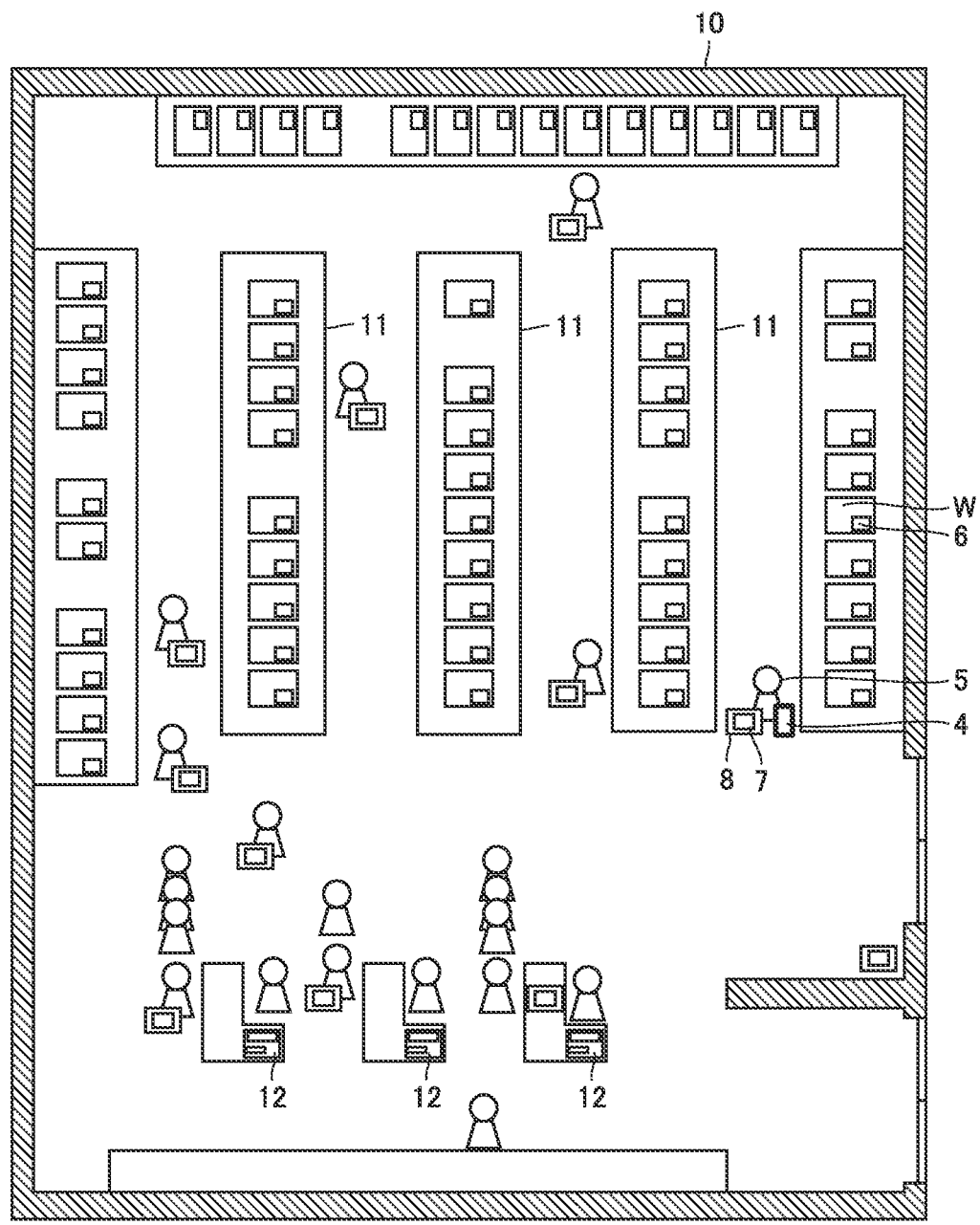
FIG. 2 is a schematic diagram schematically illustrating a store 10.

FIG. 2 is a schematic diagram schematically illustrating a store 10. The store 10 is provided with a plurality of display shelves 11, a plurality of commodities W, a plurality of shopping baskets 8, an RF (Radio Frequency) tag 6, an RF tag reader 7, and a plurality of accounting devices 12.

Figure 3:
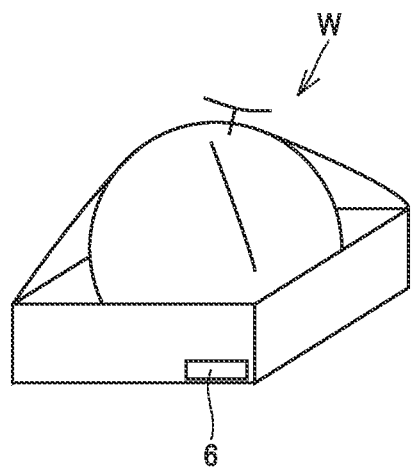
FIG. 3 is a perspective view schematically illustrating a commodity W.

The commodities W are arranged in the display shelf 11. FIG. 3 is a perspective view schematically illustrating a commodity W. Generally, the commodity W is wrapped by a package or the like. As examples of the package, various materials such as polystyrene foam, Saran wrap (registered trademark), paper, plastics and the like may be given.

The RF tag 6 is affixed to the surface of the package of the commodity W. However, if the commodity W is not wrapped by the package, the RF tag 6 may be affixed to the surface of the commodity W.

Figure 4:
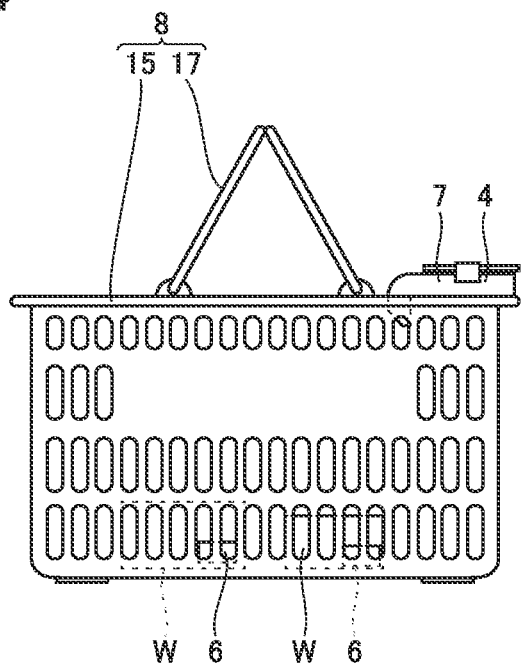
FIG. 4 is a schematic diagram schematically illustrating a shopping basket 8.

FIG. 4 is a schematic diagram schematically illustrating a shopping basket 8. The shopping basket 8 is arranged, for example, at the entrance of the store 10. The shopping basket 8 is used for accommodating any commodities W selected by the user 5.

The shopping basket 8 includes a basket body 15 and a handle 17. The basket body 15 is formed to have an opening upward. The handle 17 is attached to the basket body 15. The commodities W selected by the user 5 are housed in the shopping basket 8.

The RF tag reader 7 is disposed at an edge portion of the opening of the basket body 15. It should be noted that the RF tag reader 7 may be disposed at any position of the basket body 15.

The RF tag reader 7 is configured to communicate with the RF tag 6 affixed to each commodity W housed in the shopping basket 8 and the user terminal 4 of the user 5.

Figure 5:
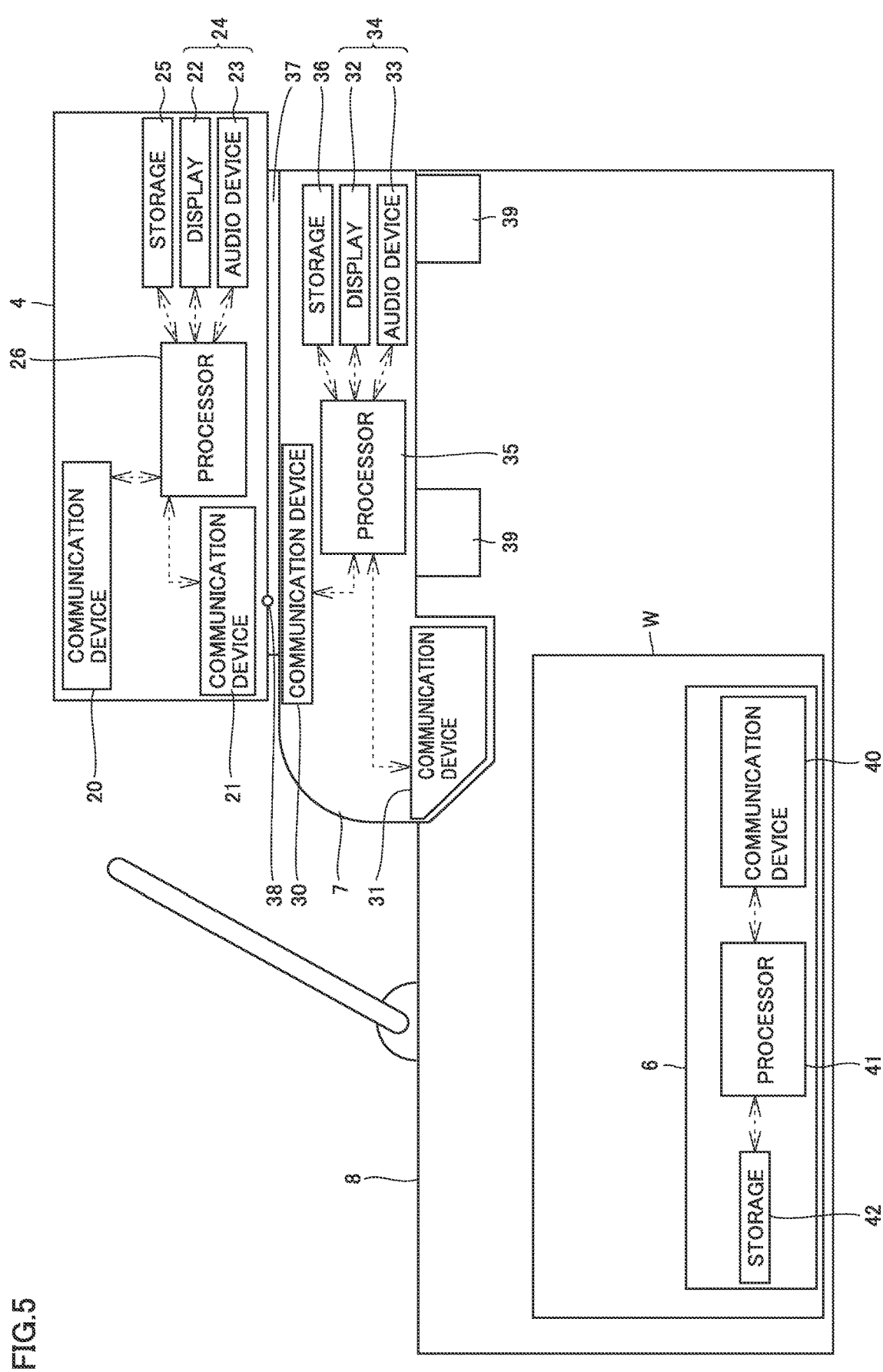
FIG. 5 is a block diagram illustrating a user terminal 4, an RF tag 6 and an RF tag reader 7.

FIG. 5 is a block diagram illustrating the user terminal 4, the RF tag 6 and the RF tag reader 7. The user terminal 4 includes a communication device 20, a communication device 21, a notification device 24, a storage 25, and a processor 26.

The communication device 20 communicates with the vehicle 3. The communication device 21 may adopt Bluetooth (registered trademark) or the like to perform communication.

The notification device 24 includes a display 22 and an audio device 23. The display 22 may be a touch panel liquid crystal display or a touch panel organic EL display, for example. The storage 25 is configured to store various information. The processor 26 is configured to perform arithmetic processing based on various information input from the communication device 20, the communication device 21 and the display 22 and various information stored in the storage 25. It should be noted that the arithmetic processing by the processor 26 may be executed by software or may be executed by hardware such as an electric circuit.

The RF tag reader 7 includes a communication device 30, a communication device 31, a notification device 34, a processor 35, a storage 36, a mounting table 37, a mounting switch 38, a fixing member 39, and a fixing band.

The communication device 30 is configured to communicate with the communication device 21 of the user terminal 4. The communication device 30 may adopt Bluetooth (registered trademark) or the like to perform communication.

The notification device 34 includes a display 32 and an audio device 33. The display 32 may be, for example, a liquid crystal screen or the like. The audio device 33 may be, for example, a speaker.

The processor 35 performs various arithmetic processing. The arithmetic processing performed by the processor 35 may be performed by software or by hardware such as an electric circuit. The storage 36 may be a nonvolatile memory.

The mounting table 37 is a table for mounting the user terminal 4. The mounting switch 38 is provided on the mounting surface of the mounting table 37, and is turned on when the user terminal 4 is mounted on the mounting table 37. The fixing member 39 is for fixing the RF tag reader 7 to the shopping basket 8. The fixing band is for fixing the user terminal 4 mounted on the mounting table 37.

The RF tag 6 includes a communication device 40, a processor 41, and a storage 42. The communication device 40 is configured to communicate with the communication device 31. The communication system between the communication device 31 and the communication device 40 may be an electromagnetic induction system, and the communication distance therebetween may be about 30 cm. Therefore, the RF tag reader 7 may communicate with the RF tag 6 of each commodity W housed in the shopping basket 8. On the other hand, the distance between the RF tag reader 7 and the RF tag 6 of each commodity W arranged on the display shelf of the store 10 is longer than the communication distance mentioned above.

Upon receiving a signal from the communication device 31, the communication device 40 sends the received signal to the processor 41, and uses the signal from the communication device 31 as the power to drive the processor 41.

The processor 41 performs arithmetic processing or the like based on the information received by the communication device 40 and the information stored in the storage 42. The arithmetic processing performed by the processor 41 may be performed by software or may be performed by hardware such as an electric circuit.

Figures 6, 7:
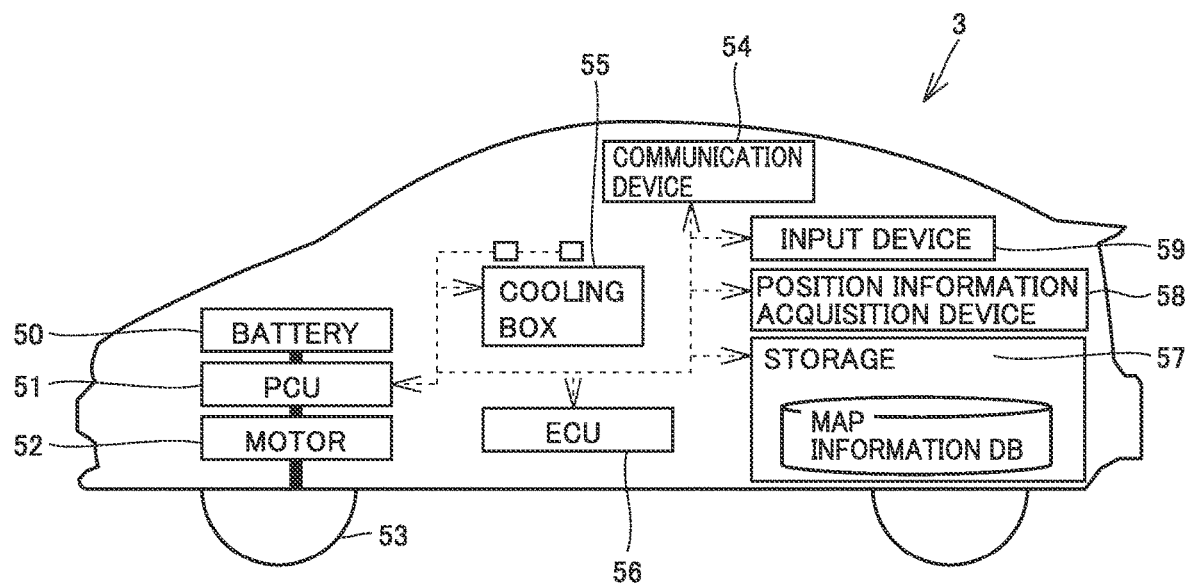
FIG. 6 is a diagram schematically illustrating information stored in a storage 42.
FIG. 7 is a schematic diagram illustrating the configuration of a vehicle 3.

The storage 42 is a rewritable nonvolatile memory. FIG. 6 is a diagram schematically illustrating information stored in the storage 42. The storage 42 stores commodity information about each commodity W to which the storage 42 is affixed.

Specifically, the commodity information includes commodity type, storage temperature, weight, storage type, and commodity shape of each commodity W.

The commodity type includes information indicating the type of each commodity W, for example, information specifically indicating the types of commodities such as beef, pork, chicken meat, scad fish, saury fish, sea bream, lettuce and tomato. The storage temperature refers to a temperature managed by the store 10 for preserving each commodity W. The storage temperature may be deduced from the present temperature of each commodity W.

The weight refers to the weight of each commodity W. The storage type includes information indicating whether a certain commodity W should be frozen, refrigerated or preserved at normal temperature. The commodity shape includes information indicating the shape of each commodity W. For example, if the commodity is meat, the commodity shape includes the cutting shapes of meat such as thin slices, thick slices and chunks.

When thawing a commodity W, the thawing temperature, the thawing speed, the thawing time, the thawing end temperature and the like should be adjusted according to the type, the weight, the shape, the temperature and the like of the commodity.

For example, the damage applied to cells due to a temperature change is different for different types of commodities. The water retention capacity and the drip amount are also different for different types of commodities.

In addition, the interior temperature distribution of a commodity when being thawed depends on the weight and shape of the commodity. For example, if a commodity W is heavy in weight and has a chunk shape, the temperature on the surface of the commodity W is easy to rise, and the temperature inside the commodity W is difficult to rise. Therefore, if the compartment temperature is rapidly raised at the time of thawing, even though the surface of the commodity W is thawed, the interior part of the commodity W may still be frozen. On the other hand, when a commodity W is a thin slice, there is no difference between the surface temperature and the interior temperature at the time of thawing, and thereby, even if the compartment temperature is raised relatively fast, both the surface and the interior part of the commodity w may be thawed.

Thus, the commodity information includes thawing information (including at least one of the type, the weight, the shape and the temperature of a commodity) that affects the thawing conditions such as the thawing temperature, the thawing speed, the thawing time, the thawing end temperature and the like.

FIG. 7 is a schematic diagram illustrating the configuration of the vehicle 3. The vehicle 3 includes a battery 50, a PCU (power control unit) 51, a motor 52, and an ECU (Electronic control unit) 56.

The battery 50 may be a lithium ion secondary battery, for example. The PCU 51 is configured to boost a DC power from the battery 50, convert the boosted DC power into an AC power, and supply the AC power to the motor 52. The motor 52 is driven by the electric power of the battery 50 supplied through the PCU 51 so as to rotate driving wheels 53. The vehicle 3 is made to travel by the driving force from the motor 52. The PCU 51 is controlled by an instruction from the ECU 56. In the present embodiment, the vehicle 3 is an electric vehicle, and it should be noted that the vehicle 3 may be a hybrid vehicle or the like.

The vehicle 3 includes a communication device 54, a cooling box 55, a storage 57, a position information acquisition device 58, and an input device 59.

The communication device 54 is configured to communicate with the communication device 20 of the user terminal 4.

Figure 8:
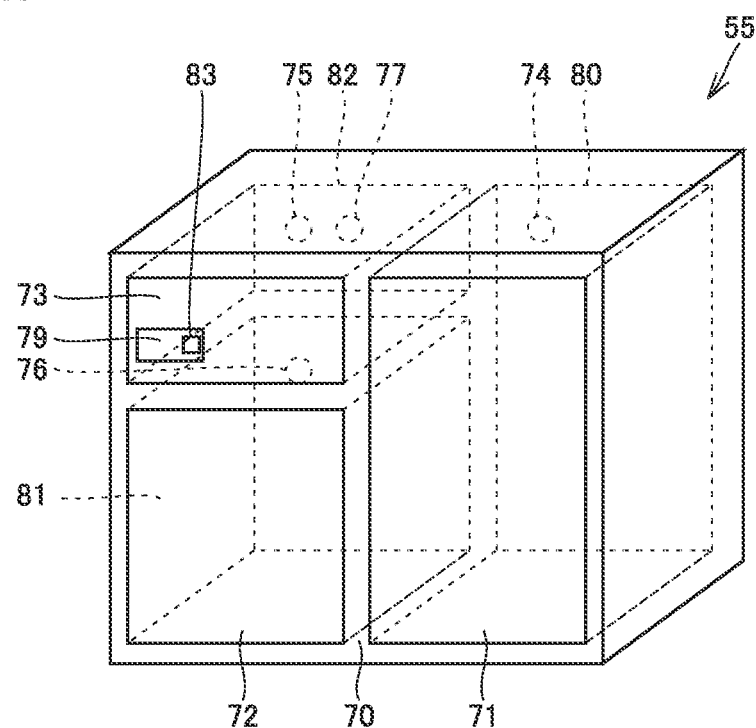
FIG. 8 is a schematic diagram schematically illustrating a cooling box 55.

FIG. 8 is a schematic diagram schematically illustrating the cooling box 55. The cooling box 55 includes a main body 70, doors 71, 72 and 73, temperature sensors 74, 75 and 76, a detection sensor 77, and an operation panel 79. The main body 70 is provided with a refrigerating compartment 80, a freezing compartment 81, and a thawing compartment 82.

The door 71 is configured to open and close the refrigerating compartment 80. The temperature sensor 74 is provided inside the refrigerating compartment 80 and configured to send temperature information in the refrigerating compartment 80 to the ECU 56.

The door 72 is configured to open and close the freezing compartment 81. The temperature sensor 76 is configured to send temperature information in the freezing compartment 81 to the ECU 56.

The refrigerating compartment 80 is connected with a cold air duct (not shown), and a damper is provided in the cold air duct. Similarly, the freezing compartment 81 is connected with a cold air duct (not shown), and a damper is provided in the cold air duct. Each cold air duct is circulated with cold air supplied from a cooling circuit (not shown).

By adjusting the opening degree of each damper, the ECU 56 adjusts the amount of cold air supplied into the refrigerating compartment 80 and the freezing compartment 81 so as to adjust the temperature in the refrigerating compartment 80 and the temperature in the freezing compartment 81.

The door 73 is configured to open and close the thawing compartment 82. The operation panel 79 is disposed on the door 73, and is provided with a display for displaying various information and a thawing button 83.

The display in the operation panel 79 is a touch panel display which is configured to display various information and is operable by the user 5. The thawing button 83 is such a button that is operated by the user 5 so as to start the thawing operation.

Figure 9:
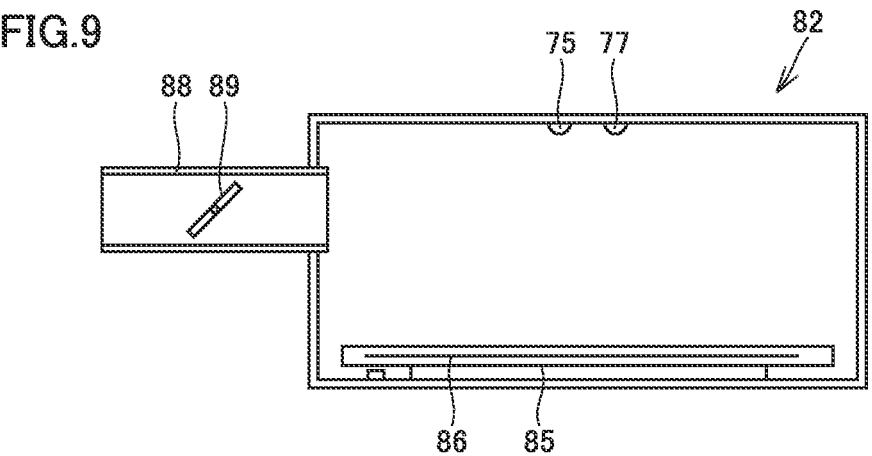
FIG. 9 is a schematic diagram schematically illustrating a thawing compartment 82.

FIG. 9 is a schematic diagram schematically illustrating the thawing compartment 82. Note that in FIG. 9, the door 73 is not illustrated.

The thawing compartment 82 includes a mounting table 85 and a heater 86 which are provided inside the thawing compartment 82. The mounting table 85 is a table on which a commodity W to be thawed is mounted. The heater 86 is provided inside the mounting table 85 so as to heat the commodity W mounted on the mounting table 85.

The detection sensor 77 is for detecting whether or not a commodity is housed in the thawing compartment 82. The detection sensor 77 sends the detection result to the ECU 56.

Thus, the detection sensor 77 and the temperature sensor 76 function as a detection unit that sends thawing compartment information of the thawing compartment 82 to the ECU 56. The thawing compartment information of the thawing compartment 82 includes the compartment temperature of the thawing compartment 82 and the presence/absence information whether or not a commodity is housed therein.

The thawing compartment 82 is connected with a cold air duct 88, and a damper 89 is provided in the cold air duct 88. The cold air duct 88 is circulated with cold air supplied from a cooling circuit (not shown). By adjusting the opening degree of the damper 89, the ECU 56 adjusts the amount of cold air to be supplied into the thawing compartment 82 so as to adjust the temperature in the thawing compartment 82.

At the time of thawing the commodity W, the ECU 56 closes the cold air duct 88 by using the damper 89, and actuates the heater 86.

When using the thawing compartment 82 as a refrigerating compartment or a freezing compartment, the ECU 56 stops the operation of the heater 86 and opens the damper 89 provided in the cold air duct 88 so as to supply cold air into the thawing compartment 82.

Returning to FIG. 7, the storage 57 is a nonvolatile memory. The storage 57 stores a map information database, for example. The storage 57 also stores information obtained through the communication device 54.

The position information acquisition device 58 obtains position information of the vehicle 3. As a way of obtaining the position information of the vehicle 3, the method of obtaining position information from WiFi (Registered Trademark), the method of obtaining position information by using GPS (Global Positioning System) or the like may be adopted. The position information acquisition device 58 sends the obtained position information to the ECU 56.

The input device 59 may be, for example, a navigation screen. The input device 59 may be, for example, a touch panel liquid crystal display screen or a touch panel organic EL display screen. The user 5 may use the input device 59 to input various kinds of information.

The operation of the thawing system 1 configured as described above will be described. In the present embodiment, it is assumed that the user 5 parks the vehicle 3 in a parking lot of the store 10, enters the store 10 for purchasing the commodities W, and holds a shopping basket 8 in his/her hand.

The user 5 fixes the user terminal 4 to the RF tag reader 7 disposed in the shopping basket 8. Specifically, the user 5 fixes the user terminal 4 to the mounting table 37 of the RF tag reader 7 by using a fixing band. When the user terminal 4 is fixed to the mounting table 37, the mounting switch 38 is turned on.

Figure 10:
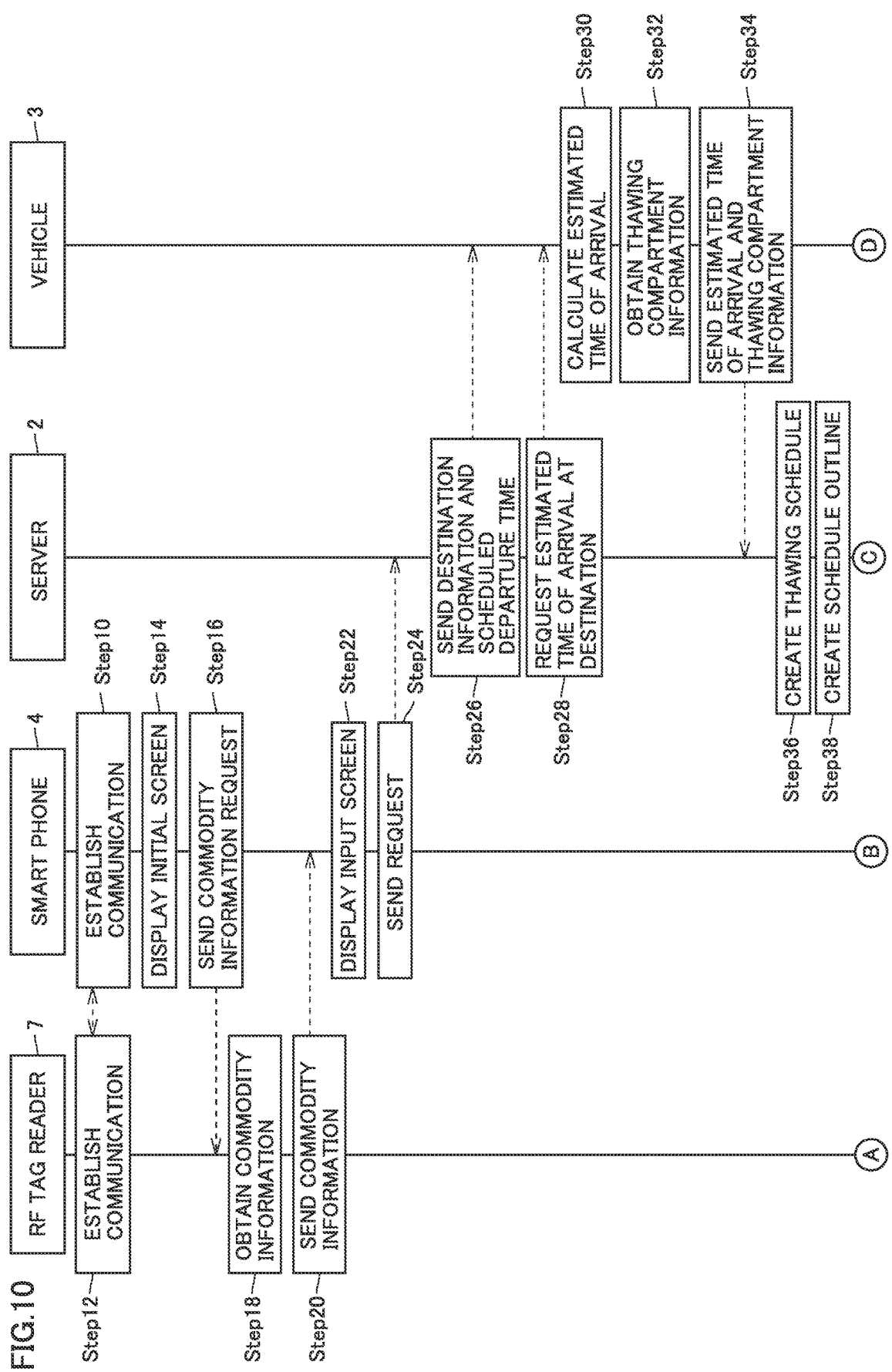
FIG. 10 is a sequence diagram illustrating operations of the thawing system 1.

FIG. 10 is a sequence diagram illustrating operations of the thawing system 1. When the mounting switch 38 is turned on, the communication is established between the user terminal 4 and the RF tag reader 7 (step 10 and step 12). Specifically, the user terminal 4 and the RF tag reader 7 are paired to each other.

As the communication is established between the user terminal 4 and the RF tag reader 7, an initial screen is displayed on the display 22 of the user terminal 4 (step 14).

Figures 11, 12:
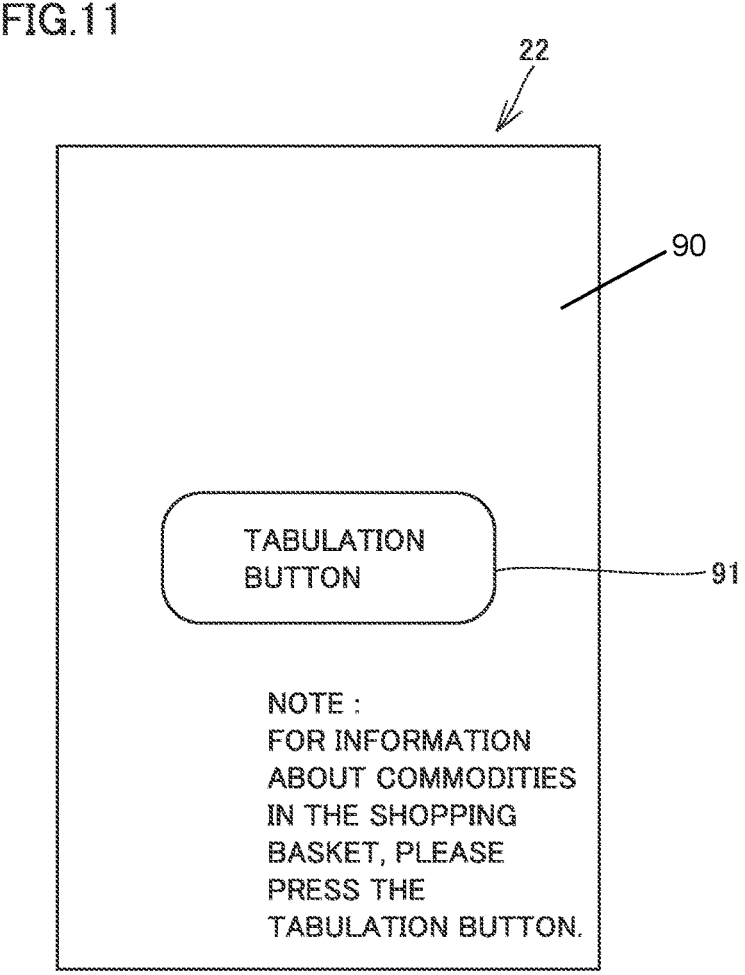
FIG. 11 is a schematic diagram illustrating an initial screen 90 displayed on a display 22.
FIG. 12 is a schematic diagram schematically illustrating commodity information received by the RF tag reader 7 which is configured to obtain commodity information of each commodity W.

FIG. 11 is a schematic diagram illustrating the initial screen 90 displayed on the display 22. A description note and a tabulation button 91 are displayed in the initial screen 90.

When the tabulation button 91 is pressed, as illustrated in FIG. 10, the user terminal 4 sends a commodity information request to the RF tag reader 7 through the communication device 21 (step 16).

Upon receiving the commodity information request, the RF tag reader 7 obtains commodity information from the RF tag 6. Specifically, as illustrated in FIG. 5, the RF tag reader 7 sends an information request to the shopping basket 8 through the communication device 31. When a commodity W is housed in the shopping basket 8, the RF tag 6 of the commodity W housed in the shopping basket 8 receives the information request. Upon receiving the information request, the RF tag 6 activates the processor 41 or the like by the power of the signal. When determining that the information request has been received, the processor 41 of the RF tag 6 sends the commodity information stored in the storage 42 to the RF tag reader 7 through the communication device 40.

When a plurality of commodities W are housed in the shopping basket 8, and thereby a plurality of RF tags 6 are housed in the shopping basket 8, the commodity information is sent to the RF tag reader 7 from each RF tag 6.

FIG. 12 is a schematic diagram schematically illustrating the commodity information received by the RF tag reader 7 which is configured to obtain the commodity information of each commodity W.

Returning to FIG. 10, upon obtaining the commodity information of the commodity W housed in the shopping basket 8 (step 18), the RF tag reader 7 sends the commodity information to the user terminal 4 (step 20).

Figure 13:
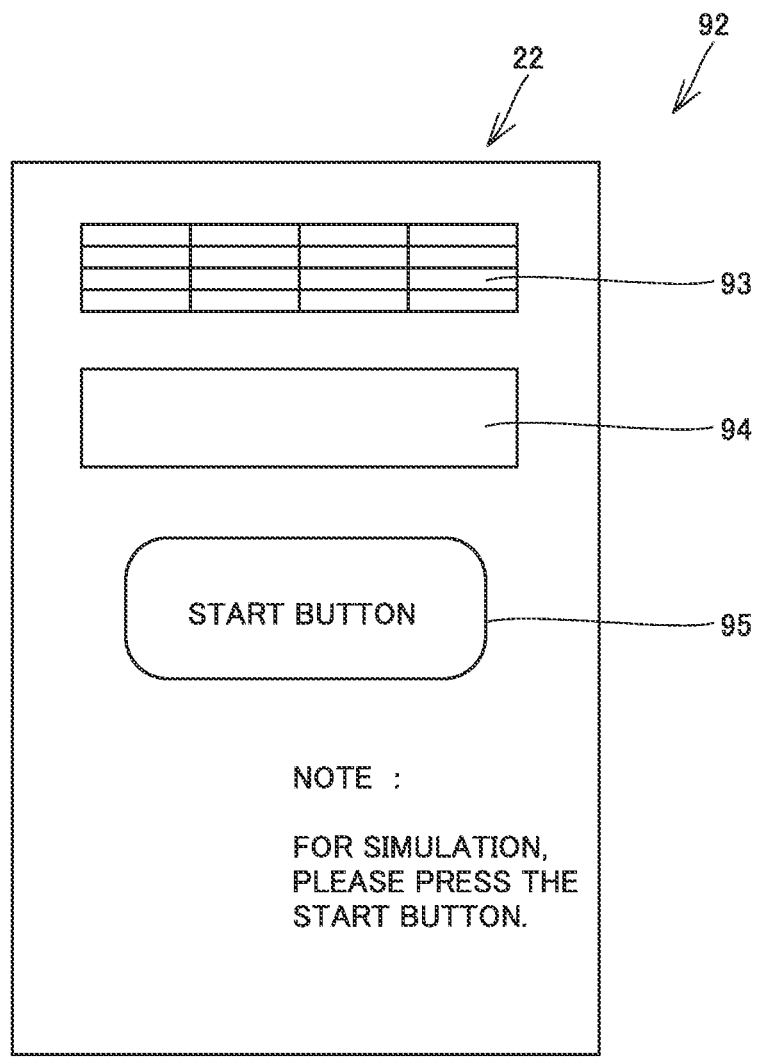
FIG. 13 illustrates an input screen 92 displayed on the display 22.

Upon receiving the commodity information, the user terminal 4 displays an input screen on the display 22. FIG. 13 displays an input screen 92 on the display 22. The input screen 92 includes a commodity information list 93, an input form 94, a start button 95, and a description note.

In the commodity information list 93, the information of a commodity W housed in the shopping basket 8 is displayed. The input form 94 is used by the user 5 to input a request.

Specifically, the input form 94 is configured to accept the selection of a commodity to be thawed, the input of a destination, the input of a thawing time limit, the input of a scheduled thawing start time, and the input of a scheduled departure time.

The destination input by the user 5 is a location that the user 5 wishes to arrive in a state where the thawing operation of a commodity W selected by the user 5 is completed. The thawing time limit input by the user 5 is a desired deadline for completing the thawing operation. The scheduled thawing start time is a scheduled time when the user 5 will press the thawing button. The scheduled departure time is a scheduled time at which the user 5 will start to move the vehicle 3. The input form 94 is only permitted to accept the input of a destination or the input of a thawing time limit.

Upon finishing the input to the input form 94, the user 5 presses the tabulation button 91.

In the example illustrated in FIG. 10, the user 5 inputs a destination in the input form 94. In the case where the user 5 inputs a thawing time limit in the input form 94, the sequence thereof will be described hereinafter.

In FIG. 10, when the tabulation button 91 is being pressed, the user terminal 4 sends the request from the user 5 to the server 2 (step 24).

The request includes the commodity information of a commodity W selected by the user 5, the destination information, the information indicating a scheduled thawing start time, and the information indicating a scheduled departure time.

Upon receiving the request, the server 2 sends the destination information and the scheduled departure time to the vehicle 3 (step 26). Then, the server 2 sends a request for the estimated time of arrival at the destination to the vehicle 3 (step 28).

Upon receiving the request for the estimated time of arrival at the destination, the communication device 54 of the vehicle 3 sends the request to the ECU 56. Upon receiving the request for the estimated time of arrival from the communication device 54, the vehicle 3 calculates the estimated time of arrival. Specifically, the ECU 56 of the vehicle 3 calculates the estimated time of arrival at the destination based on the map information database housed in the storage 57, the destination, the departure position, and the current position. The ECU 56 obtains the current position from the position information acquisition device 58.

Next, the ECU 56 of the vehicle 3 obtains thawing compartment information of the thawing compartment 82 (step 32). Specifically, the ECU 56 obtains information on the presence or absence of a commodity housed in the thawing compartment from the detection sensor 77, and obtains information on the compartment temperature from the temperature sensor 76.

The ECU 56 sends the estimated time of arrival and the thawing compartment information of the thawing compartment 82 to the server 2 through the communication device 54 (step 34). The thawing compartment information includes the information on the compartment temperature of the thawing compartment and the presence/absence information whether or not a commodity is housed therein.

Upon receiving the estimated time of arrival and the thawing compartment information, the server 2 creates a thawing schedule (step 36).

The server 2 creates the thawing schedule based on the request received from the user terminal 4, the thawing compartment information received from the vehicle 3, and the estimated time of arrival.

The thawing schedule is set with a temperature transition of the compartment temperatures in the thawing compartment 82 so that the thawing operation of a commodity W selected by the user 5 is completed before the vehicle 3 arrives at the destination.

Figure 14:
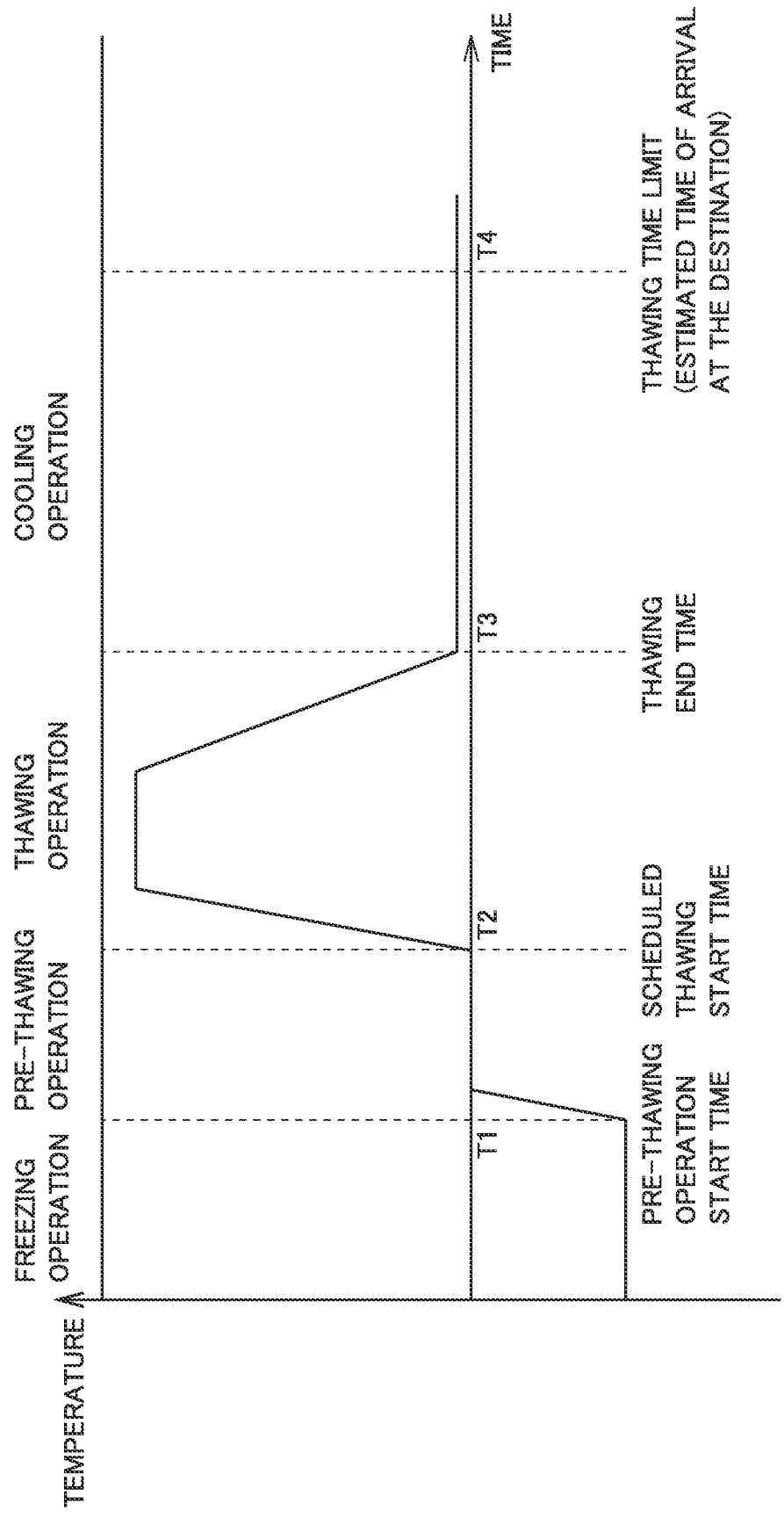
FIG. 14 is a graph illustrating an example of a thawing schedule.

FIG. 14 is a graph illustrating an example of a thawing schedule. In the example illustrated in FIG. 14, the thawing compartment 82 is driven to work as a freezing compartment, and no commodity is housed in the thawing compartment 82.

The thawing schedule illustrated in FIG. 14 includes times T1, T2, T3 and T4, and a temperature transition between the respective times.

Time T1 represents a pre-thawing operation start time. Time T2 represents a scheduled thawing start time which is included in the request received from the user terminal 4. Time T3 represents a scheduled thawing end time. Time T4 represents a thawing time limit.

In the example illustrated in FIG. 14, the estimated time of arrival at the destination received from the vehicle 3 is set as the thawing time limit T4.

The time period between time T1 and time T2 is a time period for setting the temperature inside the thawing compartment 82 to the thawing start temperature (for example, 0° C.) so that the thawing operation may be started from time T2.

The server 2 sets time T1 and the temperature transition between time T1 and time T2 based on the data stored in the server 2 and the compartment temperature. However, if the server 2 determines that a commodity is housed in the thawing compartment 82 based on the thawing compartment information received from the vehicle 3, the server 2 does not set time T1 (pre-thawing operation start time). Specifically, as illustrated in FIG. 15, a thawing schedule is created so that the compartment temperature of the thawing compartment 82 is maintained until the scheduled thawing start time.

Figure 15:
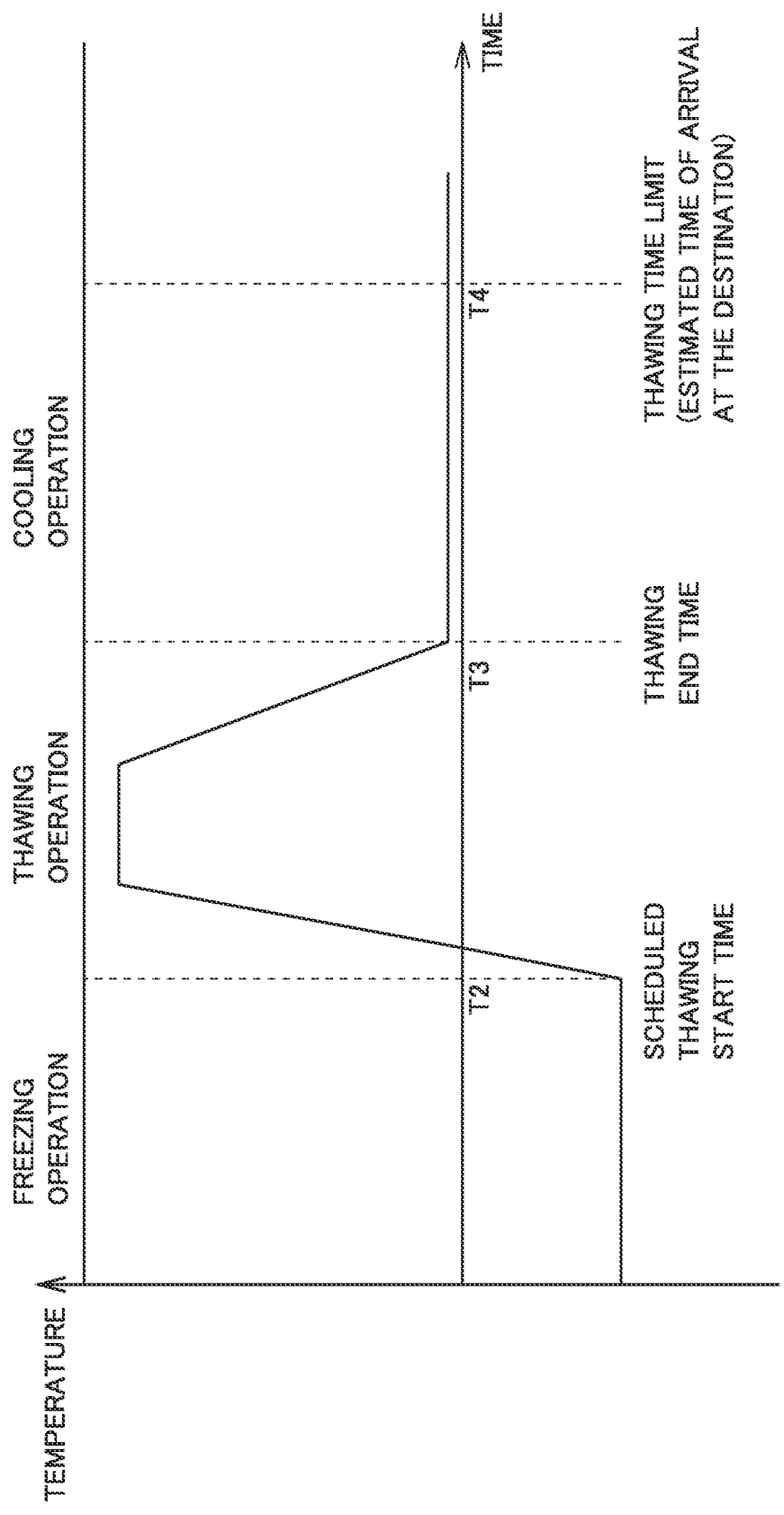
FIG. 15 is a graph illustrating an example of a thawing schedule.

In FIGS. 14 and 15, the time period between time T2 and time T3 is set for thawing a selected commodity W. Time T3 and the temperature transition between time T2 and time T3 are set based on the data stored in the server 2 and the commodity information received from the user terminal 4. Note that the server 2 sets time T1, time T2, and each temperature transition so that time T3 is earlier than time T4.

The time period between time T3 and time T4 is set for maintaining the compartment temperature of the thawing compartment 82 at a refrigerated temperature so as to preserve the thawed commodity W at the refrigerated temperature. The server 2 sets the refrigerated temperature based on the commodity information of the commodity W received from the user terminal 4 and the data stored in the server 2.

The server 2 creates another thawing schedule if the server 2 determines that the thawing operation can not be completed before the thawing time limit (the estimated time of arrival at the destination). For example, in a case where the time period of thawing is short and the quality of the commodity W may be significantly impaired if a rapid thawing operation is performed, the server 2 determines that it is impossible to complete the thawing operation before time T4. In this case, the server 2 creates a thawing schedule so as to complete the thawing operation after time T4.

After creating the thawing schedule, the server 2 creates a schedule outline (step 38).

In the case where the server 2 creates a thawing schedule that it is possible to complete the thawing operation before time T4, the server 2 creates a schedule outline including a scheduled time (time T3) at which the thawing operation is completed, an estimated time of arrival at the destination (time T4), and a message indicating that the thawing operation is possible.

In the case where the server 2 creates a thawing schedule that it is impossible to complete the thawing before time T4, the server 2 creates a schedule outline including time T3 and time T4 and a message indicating that it is impossible to complete the thawing operation before the estimated time of arrival at the destination.

Figure 16:
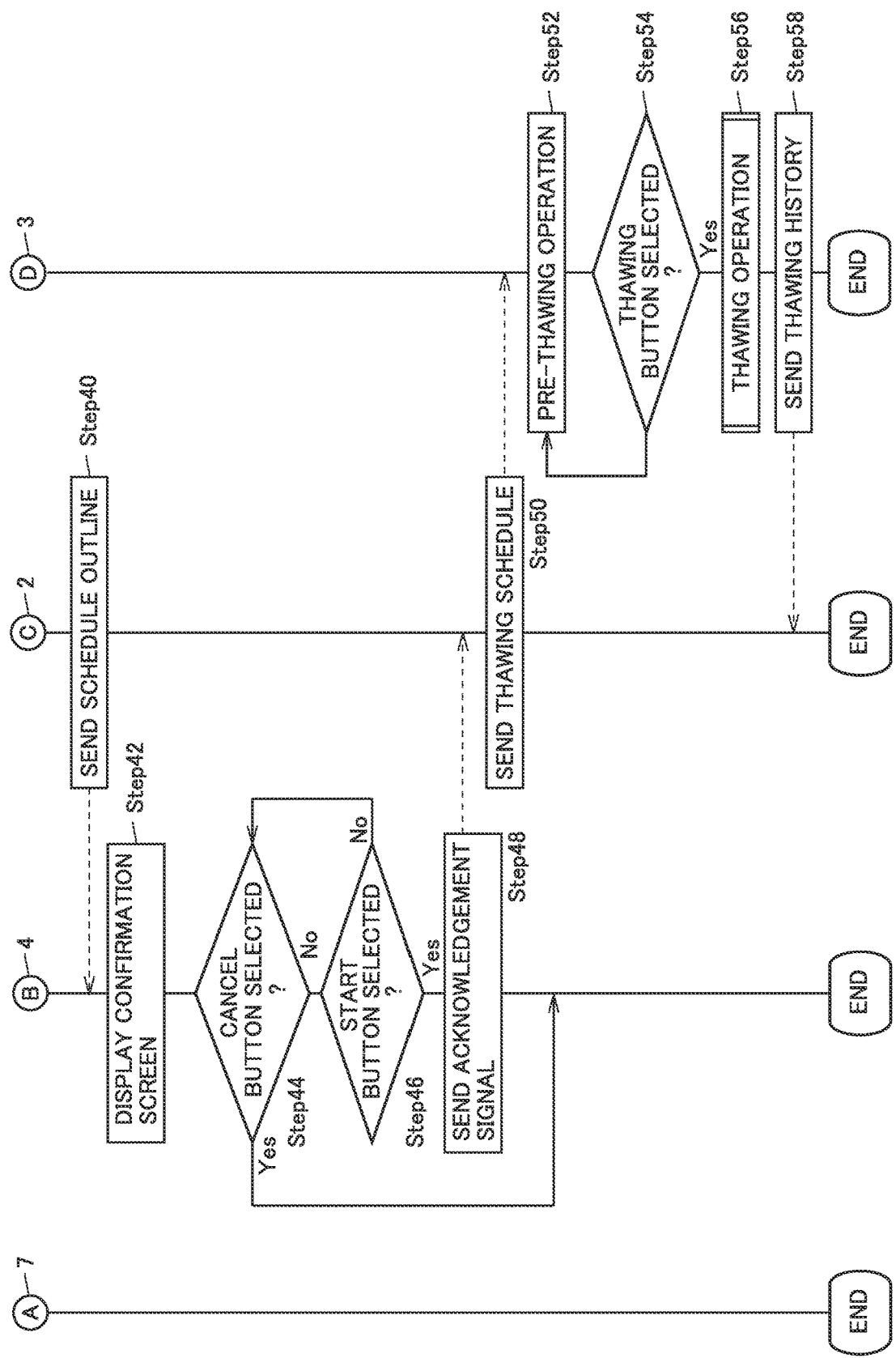
FIG. 16 is a sequence diagram illustrating operations after step 38 illustrated in FIG. 10.

FIG. 16 is a sequence diagram illustrating operations after step 38 in FIG. 10. After the schedule outline is created, the server 2 sends the created schedule outline to the user terminal 4 (step 40).

Upon receiving the schedule outline, the user terminal 4 displays a confirmation screen 96 on the display 22 (step 42).

Figure 17:
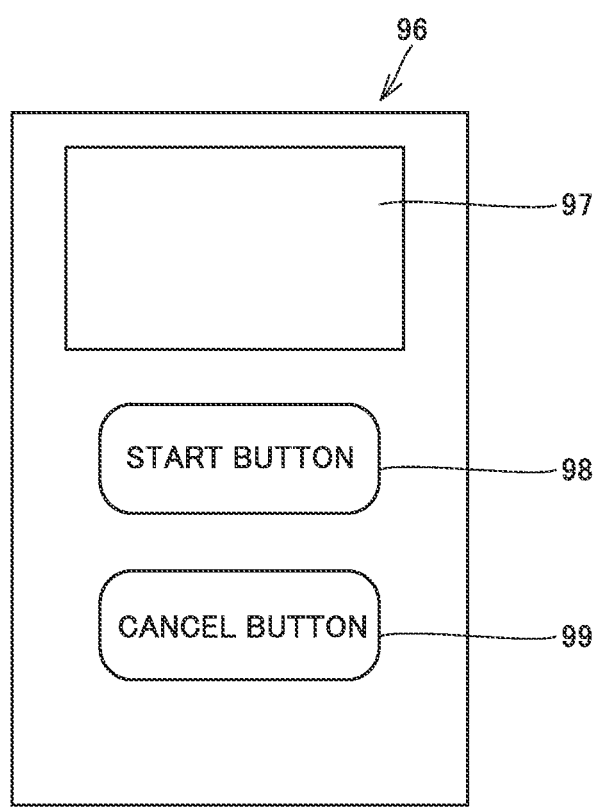
FIG. 17 is a schematic diagram schematically illustrating a confirmation screen 96 displayed on the display 22.

FIG. 17 is a schematic diagram schematically illustrating the confirmation screen 96 displayed on the display 22. The confirmation screen 96 includes an information display form 97, a start button 98, and a cancel button 99.

The schedule outline is displayed in the information display form 97. The start button 98 and the cancel button 99 are buttons to be operated by the user 5.

It should be noted that if the message indicating that it is impossible to complete the thawing operation before the estimated time of arrival at the destination, the start button 98 will not be displayed on the user terminal 4, which makes it impossible for the user 5 to select the start button 98.

After displaying the confirmation screen, the user terminal 4 determines whether the cancel button 99 is selected (step 44) or the start button 98 is selected (step 46).

If the user terminal 4 determines that the cancel button 99 is selected (Yes at step 44), the process is terminated. If the user terminal 4 determines that the start button 98 is selected (No at step 44, Yes at step 46), the user terminal 4 sends an acknowledgement signal to the server 2 (step 48).

Upon receiving the acknowledgement signal, the server 2 sends the thawing schedule to the vehicle 3 (step 50). Upon receiving the thawing schedule, the communication device 54 of the vehicle 3 sends the received thawing schedule to the ECU 56. The ECU 56 starts the pre-thawing operation based on the received thawing schedule. After the pre-thawing operation is started, the ECU 56 determines whether or not the thawing button 83 is turned on (step 54).

After determining that the thawing button 83 is turned on (Yes at step 54), the ECU 56 starts the thawing operation (step 56).

Figure 18:
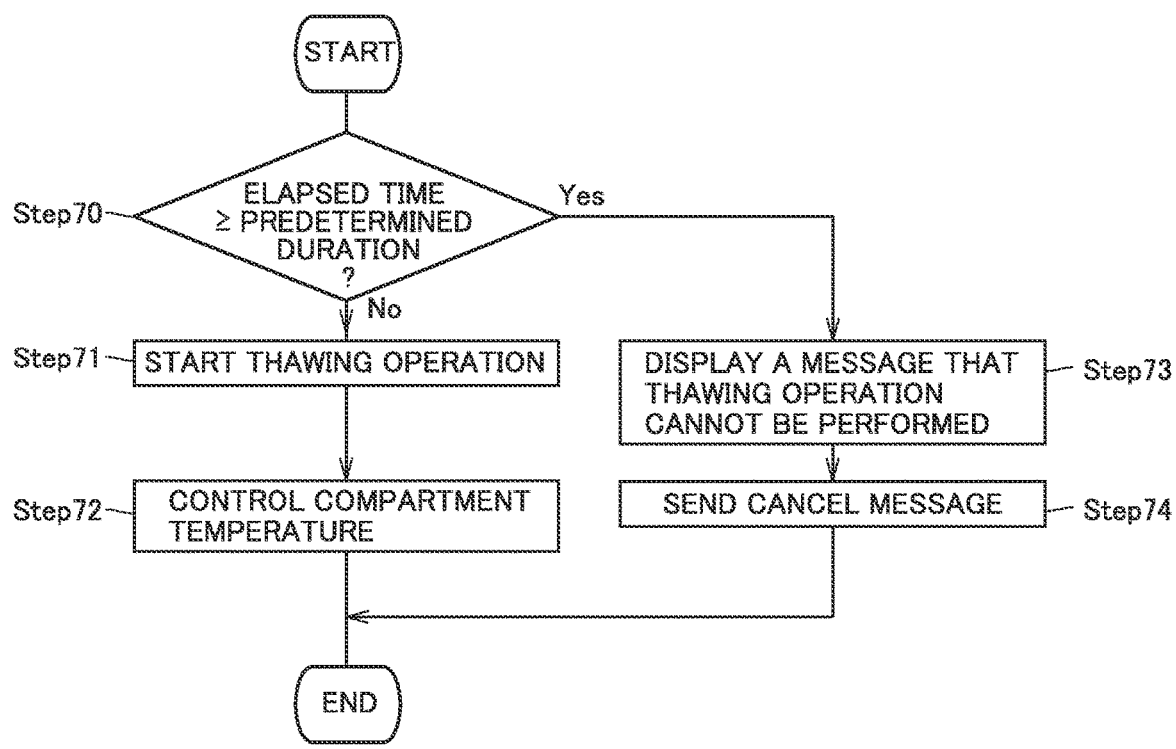
FIG. 18 is a flowchart for explaining a thawing operation.

FIG. 18 is a flowchart for explaining a thawing operation. The ECU 56 determines whether a period elapsed from the scheduled thawing start time to a time where the thawing button 83 is turned ON is equal to or longer than a predetermined duration (step 70).

If the thawing button 83 is actually pressed after the predetermined duration has elapsed from the scheduled thawing start time, the thawing operation may not be completed by the thawing time limit.

Thus, if the ECU 56 determines that the thawing button 83 is turned on after the predetermined duration has elapsed from the scheduled thawing start time (Yes at step 70), the ECU 56 displays on the display of the operation panel 79 a message that the thawing operation is impossible to be performed. Accordingly, the vehicle 3 sends to the user terminal 4 a cancel message notifying that the thawing operation is not performed (step 74).

If the ECU 56 determines that the thawing button 83 is turned on before the predetermined duration has elapsed from the scheduled thawing start time (No at step 70), the ECU 56 starts the thawing operation (step 71), and controls the compartment temperature of the thawing compartment 82 based on the thawing schedule (step 72).

Figure 19:
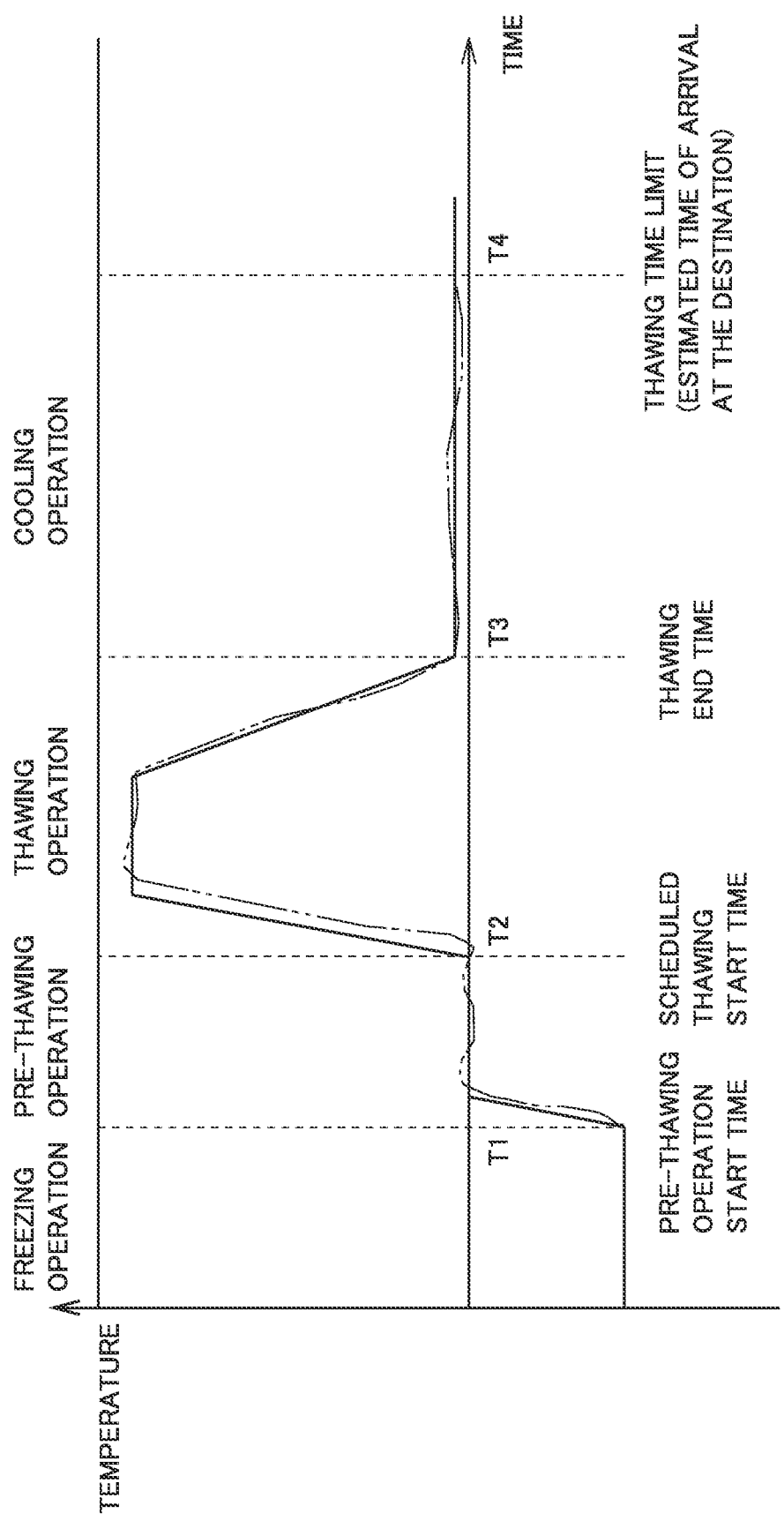
FIG. 19 is an example schematically illustrating the results of the compartment temperature control and the thawing schedule.

FIG. 19 is an example schematically illustrating the results of the compartment temperature control and the thawing schedule. As illustrated in FIG. 19, the ECU 56 actuates the heater 86 so that the compartment temperature in the thawing compartment 82 follows the thawing schedule. Specifically, the ECU 56 closes the damper 89 and actuates the heater 86.

After the thawing operation is completed, the ECU 56 maintains the temperature inside the thawing compartment 82 at the refrigerating temperature.

Thereafter, the ECU 56 sends the thawing history to the server 2 (step 58). The server 2 accumulates the thawing history and uses it as reference data at the time of creating a thawing schedule next time.

According to the thawing system 1 and the vehicle 3 according to the embodiment described above, the vehicle 3 sets the estimated time of arrival at the destination based on the destination information set by the user 5, and the server 2 sets the estimated time of arrival at the destination as the thawing time limit.

The server 2 sends a thawing schedule including the thawing time limit to the vehicle 3, and the vehicle 3 performs a temperature control on the thawing compartment 82 based on the thawing schedule. As a result, it is possible to complete the thawing operation of the commodity W by the estimated time of arrival at the destination (the thawing time limit).

The sequence diagram illustrated in FIG. 10 is described by assuming that the user 5 inputs a destination into the input form 94 at step 22.

Hereinafter, a situation where the user 5 inputs a thawing time limit into the input form 94 will be described with reference to FIG. 20.

Figure 20:
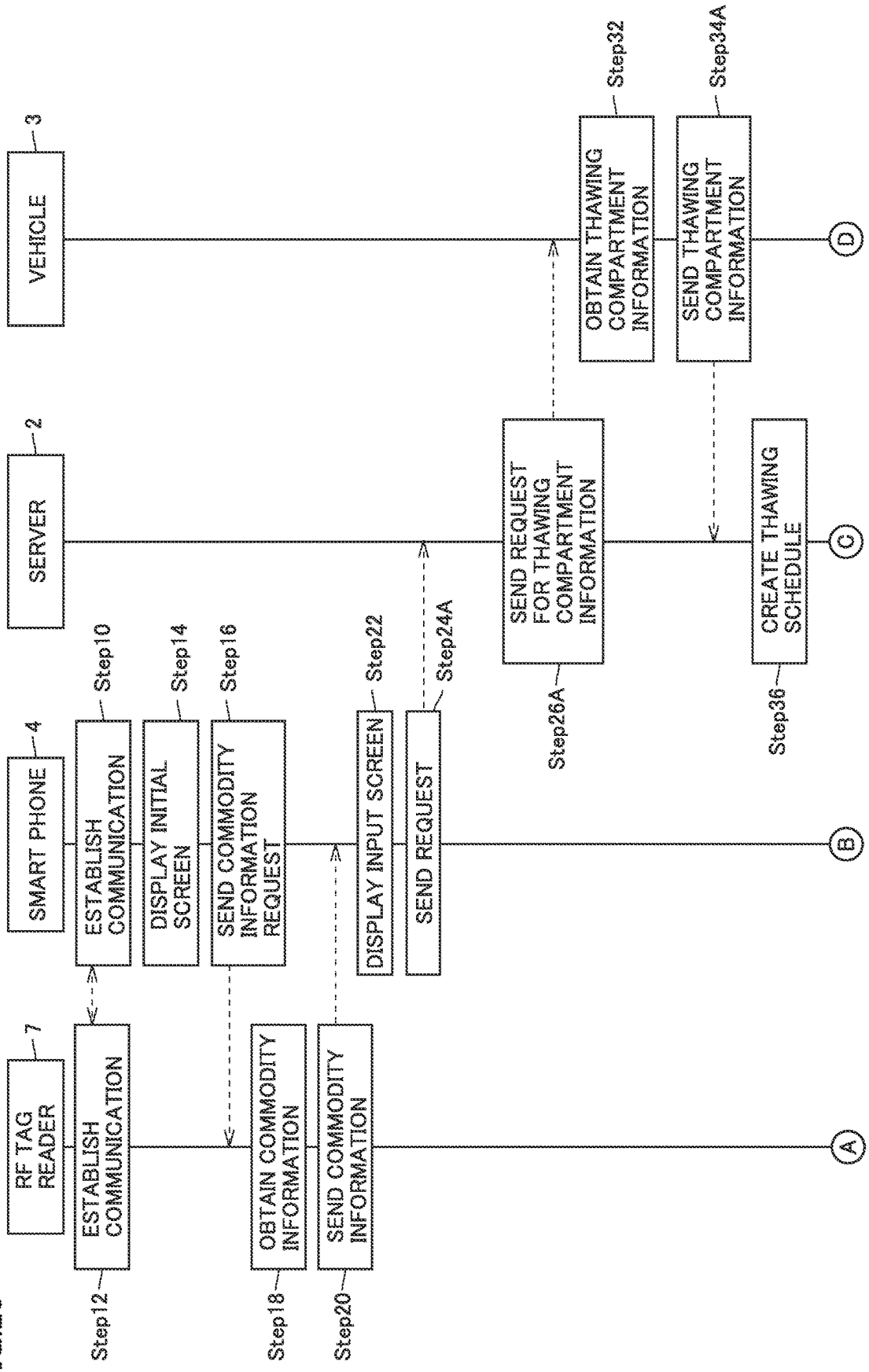
FIG. 20 is a sequence diagram illustrating operations of the thawing system 1.

FIG. 20 is a sequence diagram illustrating operations of the thawing system 1. At step 22, when a thawing time limit is input to the displayed input screen 92, the user terminal 4 sends a request to the server 2 (step 24A).

The request includes commodity information of a commodity W selected by the user 5, information indicating the thawing time limit, information indicating the scheduled thawing start time, information indicating the scheduled departure time.

After determining that the information indicating the thawing time limit has been received instead of the information indicating the destination, the server 2 sends a request for thawing compartment information to the vehicle 3 (step 26A). Upon receiving the request for thawing compartment information, the communication device 54 of the vehicle 3 sends the request for thawing compartment information to the ECU 56. Upon receiving the request for thawing compartment information, the ECU 56 obtains information on the presence or absence of a commodity housed in the thawing compartment from the detection sensor 77, and obtains information on the compartment temperature from the temperature sensor 76.

Then, the ECU 56 of the vehicle 3 sends the thawing compartment information including the information on the compartment temperature of the thawing compartment and the presence/absence information whether or not a commodity is housed therein to the server 2 through the communication device 54 (step 34 A).

The server 2 creates a thawing schedule based on the thawing compartment information and the request (step 36). At this time, the thawing time limit set by the user 5 at the user terminal 4 is set as the thawing time limit in the thawing schedule.

After the thawing schedule is created by the server 2, communication is performed among the user terminal 4, the server 2 and the vehicle 3 according to the sequence illustrated in FIG. 16. Thereby, the vehicle 3 receives the thawing schedule from the server 2.

In FIG. 20, the request from the user 5 includes the information indicating the thawing time limit, and the server 2 creates a thawing schedule based on the request. The vehicle 3 performs the thawing operation based on the thawing schedule including the thawing time limit so as to complete the thawing operation of the commodity W before the thawing time limit.

The embodiment disclosed herein is illustrative and non-restrictive in any respect. The technical scope indicated by the claims is intended to include any modifications within the scope and meaning equivalent to the terms of the claims.

What is claimed is:

1. A thawing system comprising:
   a vehicle;
   a user terminal used by a user; and
   a server configured to communicate with the user terminal and the vehicle, the vehicle including
   a thawing compartment configured to thaw a commodity housed therein; and
   an electronic control unit (ECU) configured to
   obtain information including a thawing time limit set based on a request from the user; and
   control a thawing operation of the thawing compartment, the ECU controlling the thawing compartment so as to complete the thawing operation of the commodity housed therein by the thawing time limit,
   wherein the request including thawing information affecting thawing conditions of a commodity selected by the user and destination information indicating a destination, the server is configured to obtain the thawing time limit from the destination information, the server is configured to create a thawing schedule based on the information including the thawing time limit and the destination information so as to complete the thawing operation of the commodity selected by the user by the thawing time limit, and the vehicle drives the thawing compartment based on the received thawing schedule so as to complete the thawing operation of the commodity housed therein by the thawing time limit.

\* \* \* \* \*